US00RE43314E

(19) United States
(12) Reissued Patent
Kozlowski

(10) Patent Number: US RE43,314 E
(45) Date of Reissued Patent: Apr. 17, 2012

(54) COMPACT ACTIVE PIXEL WITH LOW-NOISE IMAGE FORMATION

(75) Inventor: Lester J. Kozlowski, Simi Valley, CA (US)

(73) Assignee: AltaSens, Inc., Westlake Village, CA (US)

(21) Appl. No.: 11/800,070

(22) Filed: May 3, 2007

Related U.S. Patent Documents

Reissue of:
(64) Patent No.: 6,888,572
Issued: May 3, 2005
Appl. No.: 09/697,203
Filed: Oct. 26, 2000

(51) Int. Cl.
*H04N 5/335* (2006.01)
*H04N 5/217* (2006.01)
*H01J 27/00* (2006.01)

(52) U.S. Cl. ..... 348/308; 348/301; 348/241; 250/208.1

(58) Field of Classification Search ..... 348/308, 348/301, 294
See application file for complete search history.

(56) References Cited

U.S. PATENT DOCUMENTS

| | | | | |
|---|---|---|---|---|
| 4,249,122 | A | | 2/1981 | Widlar |
| 4,463,383 | A | | 7/1984 | Soneda et al. |
| 4,466,018 | A | | 8/1984 | Soneda et al. |
| 4,676,761 | A | | 6/1987 | Poujois |
| 4,794,247 | A | | 12/1988 | Stineman et al. |
| 5,043,820 | A | | 8/1991 | Wyles et al. |
| 5,055,667 | A | | 10/1991 | Sayag |
| 5,083,016 | A | | 1/1992 | Wyles et al. |
| 5,128,534 | A | | 7/1992 | Wyles et al. |
| 5,146,302 | A | | 9/1992 | Kumada |
| 5,262,871 | A | * | 11/1993 | Wilder et al. ..... 348/307 |
| 5,296,696 | A | | 3/1994 | Uno |
| 5,345,266 | A | | 9/1994 | Denyer |
| RE34,802 | E | | 11/1994 | Sayag et al. |
| 5,382,977 | A | | 1/1995 | Kozlowski et al. |
| RE34,908 | E | | 4/1995 | Wyles et al. |
| 5,461,419 | A | * | 10/1995 | Yamada ..... 348/302 |
| 5,471,515 | A | * | 11/1995 | Fossum et al. ..... 377/60 |
| 5,541,402 | A | | 7/1996 | Ackland et al. |
| 5,576,763 | A | | 11/1996 | Ackland et al. |
| 5,587,596 | A | | 12/1996 | Chi et al. |
| 5,608,243 | A | | 3/1997 | Chi et al. |

(Continued)

FOREIGN PATENT DOCUMENTS

WO WO 9953683 A1 * 10/1999

(Continued)

OTHER PUBLICATIONS

R.H. Dyck and G.P. Weckler, "Integrated Arrays Of Silicon Photodetectors For Image Sensing", IEEE Trans. Electron Devices, ED-15, Apr. 1968, pp. 196-201.

(Continued)

*Primary Examiner* — Lin Ye
*Assistant Examiner* — Amy Hsu
(74) *Attorney, Agent, or Firm* — Reed Smith LLP

(57) ABSTRACT

A low-noise active pixel circuit is disclosed that efficiently suppresses reset (kTC) noise by using a compact preamplifier consisting of a photodetector and only three transistors of identical polarity, in conjunction with ancillary circuits located on an imager's periphery. The use of only three transistors with a tapered reset signal allows the optical area to be increased, while still providing a low-noise imager.

16 Claims, 8 Drawing Sheets

U.S. PATENT DOCUMENTS

| | | | | |
|---|---|---|---|---|
| 5,627,112 | A | 5/1997 | Tennant et al. | |
| 5,665,959 | A | 9/1997 | Fossum et al. | |
| 5,898,168 | A | 4/1999 | Gowda et al. | |
| 5,929,434 | A | 7/1999 | Kozlowski et al. | |
| 5,933,190 | A | 8/1999 | Dierickx et al. | |
| 5,952,686 | A * | 9/1999 | Chou et al. | 257/292 |
| 6,001,668 | A | 12/1999 | Anagnostopoulos et al. | |
| 6,064,431 | A | 5/2000 | Ueno | |
| 6,130,423 | A * | 10/2000 | Brehmer et al. | 250/208.1 |
| 6,166,767 | A * | 12/2000 | Watanabe | 348/301 |
| 6,243,134 | B1 | 6/2001 | Beiley | |
| 6,424,375 | B1 * | 7/2002 | Fowler | 348/241 |
| 6,469,740 | B1 * | 10/2002 | Kuroda et al. | 348/308 |
| 6,493,030 | B1 * | 12/2002 | Kozlowski et al. | 348/310 |
| 6,532,040 | B1 * | 3/2003 | Kozlowski et al. | 348/241 |
| 6,538,245 | B1 * | 3/2003 | Kozlowski | 250/208.1 |
| 6,650,369 | B2 * | 11/2003 | Koizumi et al. | 348/301 |
| 6,697,111 | B1 * | 2/2004 | Kozlowski et al. | 348/302 |

FOREIGN PATENT DOCUMENTS

WO WO 0055919 A1 * 9/2000

OTHER PUBLICATIONS

J.D. Plummer and J.D. Meindl, "MOS Electronics For A portable Reading Aid For The Blind", IEEE J. Solid-State Circuits, SC-7, Apr. 1972, pp. 111-119.

N. Koikke, I. Takemoto, K. Satoh, S. Hanamura, S. Nagahara and M. Nubo, "MOS Area Sensor: Part I—Design Consideration And Performance Of An n-p-n Structure 484×384 Element Color MOS Imager", IEEE Trans Electron Devices, ED-27 (8), Aug. 1980, pp. 1676-1681.

S. Ohba, M. Nakai, H. Ando, S. Hanamura, S. Shimada, K. Satoh, K. Takahashi, M. Kubo and T. Fujita, "MOS Area Sensor: Part II—Low Noise MOS Area Sensor with Antiblooming Photodiodes", IEEE Trans. Electron Devices, ED-27 (8), Aug. 1980, pp. 1682-1687.

EG&G Reticon Sales Catalog, *Image Sensing and Solid State Camera Products 1994/1995.* Solid State Image Sensor Array Specification For Part No. RA0256B.

EG&G Reticon Sales Catalog, *Image Sensing and Solid State Camera Products 1994/1995. High-Speed* Solid State Image Sensor Array Specification For Part No. RA2568N.

EG&G Reticon Sales Catalog, *Image Sensing and Solid State Camera Products 1994/1995.* Solid State Sensor Arrays Specification For Part Nos. RA0100A/RA0128N.

H. Ando, S. Ohba, M. Nakai, T. Ozaki, M. Ozawa, K. Ikeda, T. Masuhara, T. Imaide, I. Takemoto, T. Suzuki and T. Fujita, "Design Consideration And Performance Of A New MOS Imaging Device", IEEE Trans. On Elec. Dev., ED-32 (8), Aug. 1985, pp. 1484-1489.

N. Tanaka, T. Ohmi and Y. Nakamura, "A Novel Bipolar Imaging Device With Self-Noise Reduction Capability", IEEE Trans. Elec. Dev., 36 (1), Jan. 1989, pp. 31-38.

G.P. Weckler, "Storage Mode Operation Of A Phototransistor And Its Adaptation To Integrated Arrays Foe Image Detection", IEDM, Oct. 1996. (Abstract Only—No known paper available from professional document delivery services).

N. Tanaka, T. Ohmi, Y. Nakamura and S. Matsumoto, "A Low-Noise Bi-CMOS Linear Imager Sensor With AufoFocusing Function", IEEE Trans. Elec. Dev., 36 (1), Jan. 1989, pp. 39-45.

N. Tanaka, S. Hashimoto, M. Shinohara, S. Sugawa, m. Norishita, S. Matsumora, Y. Nakamura and T. Ohmi, A 310k Pixel Bipolar Imager (BASIS), ISSCC 1989.

G.P. Weckler, "Charge Storage Lights The Way for Solid-State Image Sensors", Electronics, May 1, 1967, pp. 75-78.

G.P. Weckler, "Operation of p-n Junction Photodetectors in A Photon Flux Integrating Mode", IEEE Journal of solid State Circuits, vol. SC-2, No. 3, Sep. 1967, pp. 65-73.

G.P. Weckler and R.H. Dyck, "Integrated Arrays Of Silicon Photodetectors For Image Sensing", Wescon, Aug. 22-25, 1967, pp. 1-8.

L.J. Kozlowski, J. Luo, W.E. Kleinhans and T. Lui, "Comparison of Passive And Active Pixel Schemes for CMOS Visible Imagers", SPIE, vol. 3360, Apr. 1998.

Ming-Jer Chin, Yen-Bin Gu, Terry Wu, Po-Chin Hsu and Tsung-Hann Liu, "Weak Inversion Charge Injection In Analog MOS Switches", IEEE Journal of Solid-State Circuits, vol. 30, No. 5, May 1995, pp. 604-606.

Peter W. Fry, Peter J. W. Noble and Robert J. Rycroft, "Fixed-Pattern Noise In Photomatrices", IEEE Journal of Solid-State Circuits, vol. SC-5, No. 5, Oct. 1970, pp. 250-254.

Degrauwe, et al., "A Microppower CMOS-Instrumentation Amplifier", IEEE Journal Of Solid-State Circuits, vol. SC-20, No. 3 Jun. 1985, pp. 805-807.

Letter Dated Jul. 31, 1998, From Gene Weckler, RAD-I-CON Imaging Corp., addressed to Mark Wettler.

Chamberlin, et al., "A Novel Wide Dynamic Range Silicon Photodetector And Linear Imaging Array", IEEE Transactions On Electron Devices, Vo. ED-31, No. 2, Feb. 1984, pp. 175-182.

L.J. Kozlowski, D. Standley, J. Luo, A Tomasini, A. Gallagher, R. Mann, B.C. Hsieh, T. Liu and W.E. Kleinhans, "Theoretical Basis And Experimental Confirmation: Why A CMOS Imager Is Superior To A CD", SPIE Conference on Infrared Technology and Applications XXV, Orlando, Fla, Apr. 1999, vol. 369, pp. 388-396.

Mendis, et al., "A 128×128 CMOS Active Pixel Image Sensor for Highly Integrated Imaging Systems," IEEE Electron Device Meeting, p. 583, 1993.

Copy of International Search Report.

* cited by examiner

COMPACT ACTIVE PIXEL WITH LOW-NOISE IMAGE FORMATION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to electronic imaging devices and, more particularly, to low noise CMOS image sensors having increased optical area within each pixel.

2. Description of the Related Art

Significant advances in photosensor image processing for camera and video systems are now possible through the emergence of CMOS pixel sensors. CMOS-based imaging sensors have distinct manufacturing cost savings and consume much less power than other technologies such as charge coupled devices (CCD). A CMOS image sensor's performance, however, is often limited by the noise generated by resetting each of its photodiodes to a known potential after each electronic image, or picture, is read out. Such noise is readily suppressed in CCD-based cameras because CCD reset noise is generated on only one capacitance, i.e., the sense diffusion diode that converts the photo-generated charge to a voltage. Also, full-frame memory is not needed to post-process the video to remove the reset noise because each pixel's reset and signal levels are successively read and the reset noise is conveniently removed by using only one memory element.

Similarly, the reset noise (kTC) in a CMOS sensor causes uncertainty about the voltage on each photodetector following the reset, but each pixel's reset signal is not normally available. Because the reset noise of CMOS imagers is often the dominant source of temporal noise and is critical to overall imager performance, there is a need for a pixel-based preamplifier that suppresses reset noise without requiring separate readout of all the reset and signal levels, in order to subsequently subtract the correlated reset noise using full-frame memory. In addition, the preamplifier must be as compact as possible to maximize the fraction of pixel area that is used for collecting the light. Simultaneously maximizing the light-gathering area and minimizing the reset noise maximizes sensor performance so that it can operate with usable fidelity even at low levels of light.

Mendis et al., discloses a single-stage, charge coupled device (CCD) type of image sensor in an article entitled, "A 128×128 CMOS Active Pixel Image Sensor for Highly Integrated Imaging Systems", IEEE Electron Devices Meeting, p. 583, 1993. The overall imager is customarily considered a CMOS imager due to the co-integration of ancillary CMOS electronics that support the pixel preamplifier—even though the scheme requires process enhancements that significantly depart from conventional CMOS technologies. For example, the photogate must be optically transparent in the visible part of the electromagnetic spectrum. A transparent gate electrode must preferably be used to provide reasonable sensitivity in the blue part of the visible spectrum as is commonly done in CCDs, e.g. a thin indium tin oxide (ITO) gate electrode (e.g. U.S. Pat. No. 6,001,668). No CMOS foundry processes support integration of ITO electrodes due to possible wafer contamination and concomitant yield loss. Nevertheless, Mendis' charge-based preamplifier ideally provides a storage site at each pixel that readily facilitates both snapshot image formation and in-pixel correlated double sampling. Another key issue related to incompatibility with standard CMOS technology is the difficulty in optically isolating this storage site to eliminate image smear.

U.S. Pat. No. 5,898,168 teaches a compact CMOS pixel-based preamplifier that uses only three transistors, reproduced as FIG. 1, by providing a row-based circuit and method for successively reading the reset and signal levels. The system requires that the column buffer supporting each column of pixels preferably dwells on each specific row (c.f., FIGS. 5 and 6 of U.S. Pat. No. 5,898,168) in order to optimally perform the correlated double sampling required for suppressing reset noise by successively reading each video line's reset and signal levels. Alternatively, a full page of memory must be allocated either on-chip or in the external camera electronics to subtract each pixel's reset value from its final signal value on a frame-by-frame basis. Further, the image formation process should preferably be performed on a row-by-row basis in order to minimize inaccuracy in measuring the reset and signal levels for each pixel. The basic three transistor circuit thus generates large motion artifacts because of the need to successively read the reset and signal levels during each line of video. Minimizing such artifacts results in an alternative embodiment comprising five transistors per pixel, as illustrated in FIG. 1S of the '168 patent.

FIG. 2 is reproduction of the timing diagram for operating the three transistor pixel of the '168 patent. Each line of video in the imager is separately reset (47), signals are separately integrated (39, 41 and 43), separately read (49), and then reset again to prepare for the next frame time. An imager comprising N rows thus forms an electronic image over N separate integration times.

In view of the foregoing, it would be desirable to have a pixel cell comprising only three transistors, to maximize the optical area, while still having low-noise and minimizing motion artifacts.

SUMMARY OF THE INVENTION

In general, the present invention comprises a low-noise imaging system for implementation in CMOS or in other semiconductor fabrication technologies. The low-noise amplifier system efficiently suppresses reset (kTC) noise by using a compact preamplifier consisting of a photodetector and only three transistors of identical polarity in conjunction with ancillary circuits located on the CMOS imager's periphery. A tapered reset signal is applied to a reset transistor within the pixel to reduce the reset noise. The supporting circuits help the simplified pixel circuit to read the signal with low noise without having to perform correlated double sampling on either successive rows or the entire array.

The low noise amplifier system of the present invention is formed by the aggregate circuitry in each pixel, the supporting circuitry in the column buffer amplifier and the row-based clock driver, and the waveform generation circuits servicing each column and row of pixels. The video from the active pixels is read out by the low-noise signal amplification system in a manner that essentially eliminates the reset noise. In addition to means for suppressing the detector's reset noise, the column buffer in the downstream electronics typically performs additional signal processing, sample-and-hold, optional video pipelining, and column amplifier offset cancellation functions to suppress the temporal and spatial noise that could otherwise be generated by the column buffer.

The low-noise system provides the following key functions: (1) suppresses reset noise without having to provide means for analog memory to facilitate correlated double sampling; (2) provides high sensitivity via source follower amplification with small sense capacitance; (3) minimizes demand on amplifier bandwidth to avoid generation of fixed pattern noise due to variations in amplifier time constant and stray capacitance; (4) provides adequate power supply rejection to enable development of imaging systems-on-a-chip that do not require elaborate support electronics; and (5) is compatible with application to imaging arrays having pixel pitch to below 2.7 microns with high optical fill factor and low noise using 0.18 μm CMOS technology.

The invention has the advantage of full process compatibility with standard silicided submicron CMOS; helps to maximize yield and minimize die cost because the circuit complexity is distributed amongst the active-pixels and peripheral circuits; and exploits the signal processing capability inherent to CMOS. Also, the spectral response is broad from the near-ultraviolet (400 nm) to the near-IR (>800 nm).

Because the present invention has only three MOSFETs in each pixel, the invention provides as-drawn optical fill factor of 60% at 5 μm pixel pitch using 0.25 μm design rules in CMOS. The actual optical fill factor is somewhat larger due to lateral collection and the large diffusion length of commercial CMOS processes. A final advantage is the flexibility to collocate digital logic and signal-processing circuits due its high immunity to electromagnetic interference.

When fully implemented in the desired camera-on-a-chip architecture, the low-noise APS can provide temporal read noise below 10 e− (at data rates compatible with either video imaging or still photography via electronic means), fixed pattern noise significantly below 0.02% of the maximum signal (on a par with competing CCD imagers), <0.5% non-linearity, >1V signal swing for 3.3 V power supply, large charge-handling capacity, and variable sensitivity using simple serial interface updated on a frame-by-frame basis via digital interface to a host microprocessor.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a low noise CMOS image sensor circuit. Any and all such modifications, equivalents and alternatives are intended to fall within the spirit and scope of the present invention.

The CMOS readout and amplification system of the present invention includes an exemplary design for an active-pixel CMOS imager. A prototype embodiment of the low-noise Active Pixel Sensor (APS) invention can be configured, for example, as a visible imager comprising an array of 1024 (columns) by 728 (rows) of visible light detectors (photodetectors). The rows and columns of active-pixels can be spaced 5 microns center-to-center using 0.25 μm design rules to provide as-drawn optical fill factor of ~60%. Several columns and rows of detectors at the perimeter of the light-sensitive region are normally covered with metal and used to establish the dark level for on-chip or off-chip signal processing. In addition, the detectors in each row can be covered with color filters to produce color imagers. For example, the odd rows may begin at the left with red, green, then blue filters, and the even rows may begin with blue, red, then green filters, with these patterns repeating to fill the respective rows. A standard Bayer filter pattern can also be applied.

Figure 1:
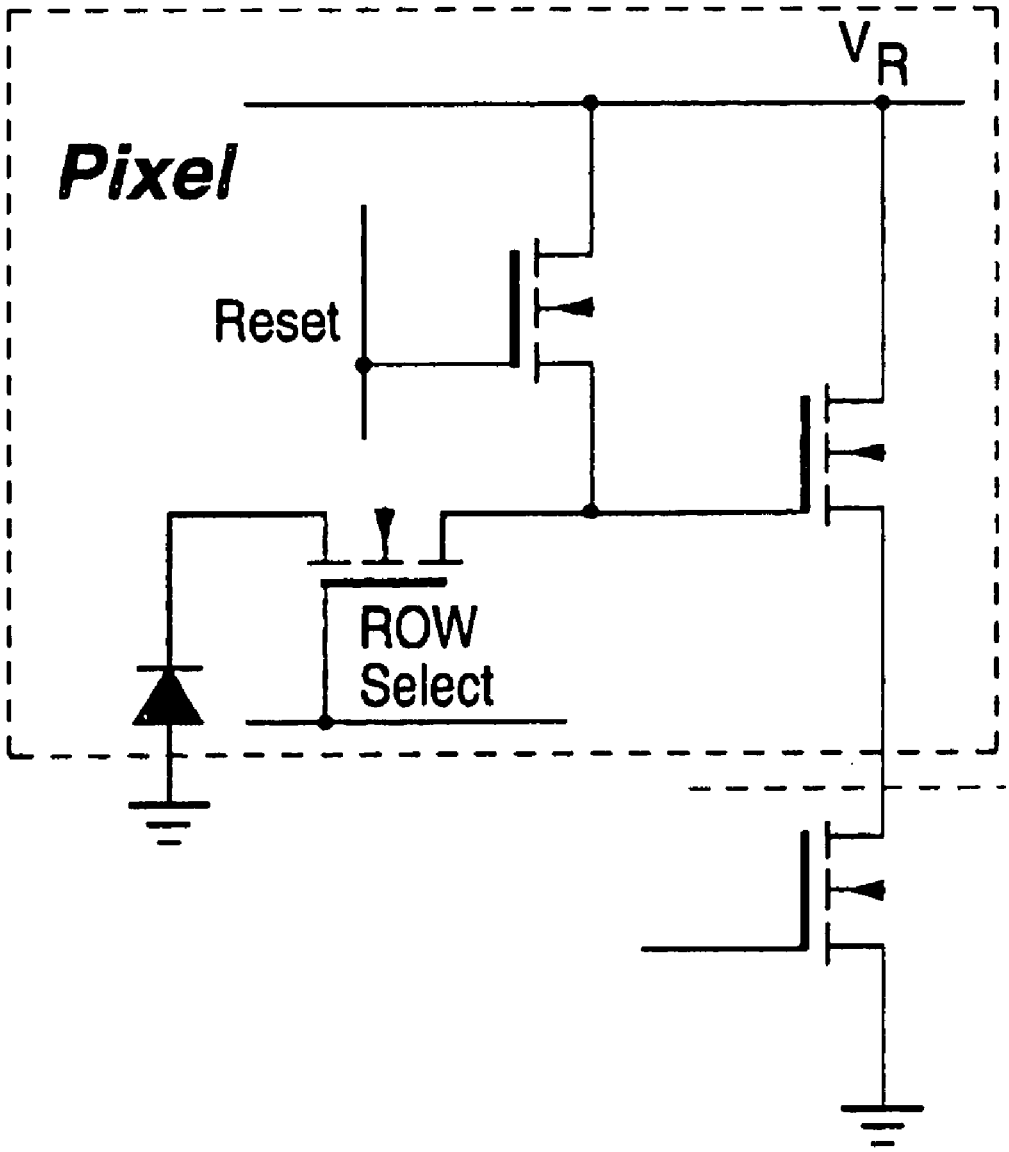
FIG. 1 (PRIOR ART)
FIG. 1 is a schematic of a prior art circuit taught by U.S. Pat. No. 5,898,168.
Figure 2:
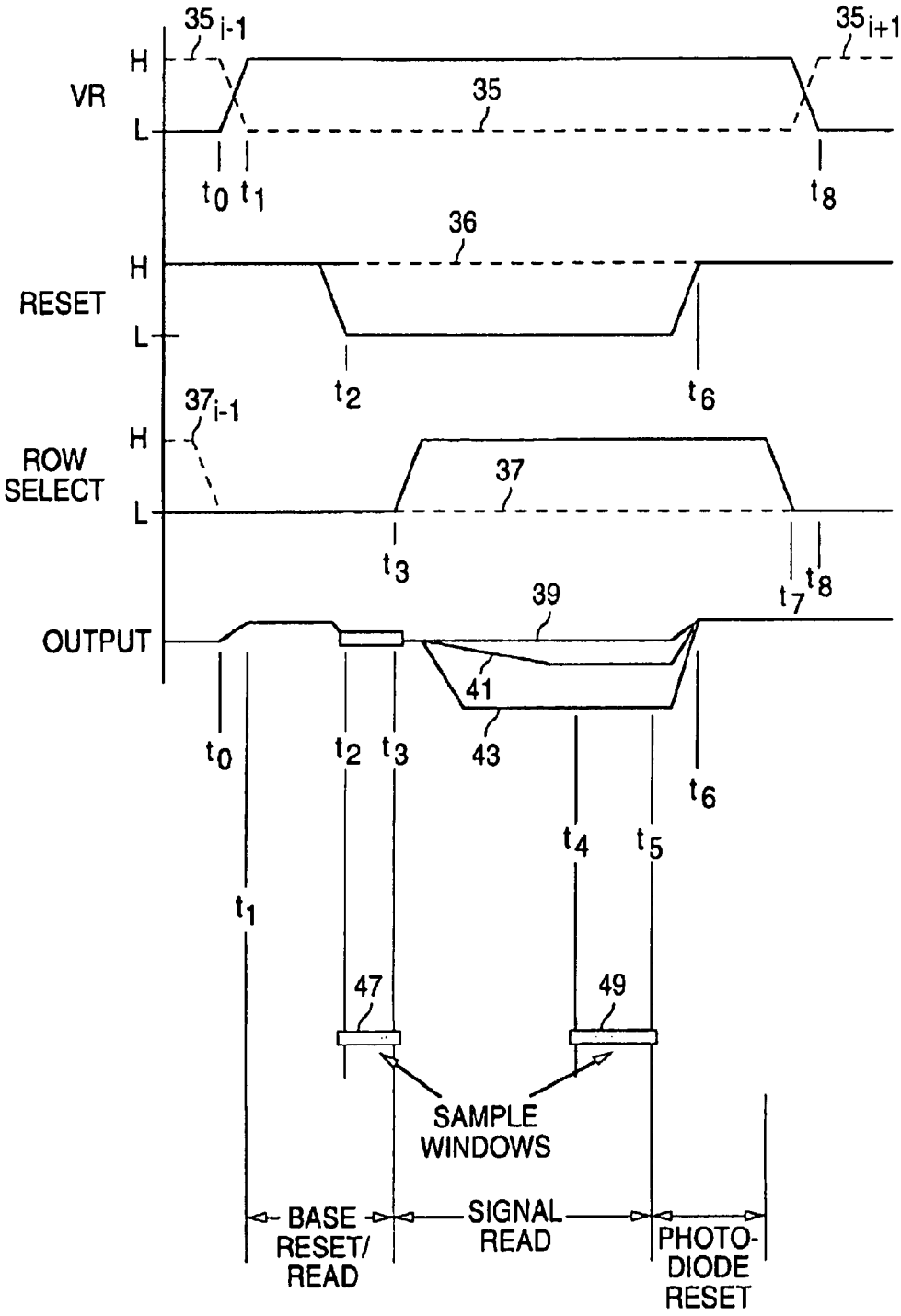
FIG. 2 (PRIOR ART)
FIG. 2 is a timing diagram illustrating the operation of the prior art circuit taught by U.S. Pat. No. 5,898,168, including the specific read out of both the reset and signal levels on a row-by-row basis.
Figure 3:
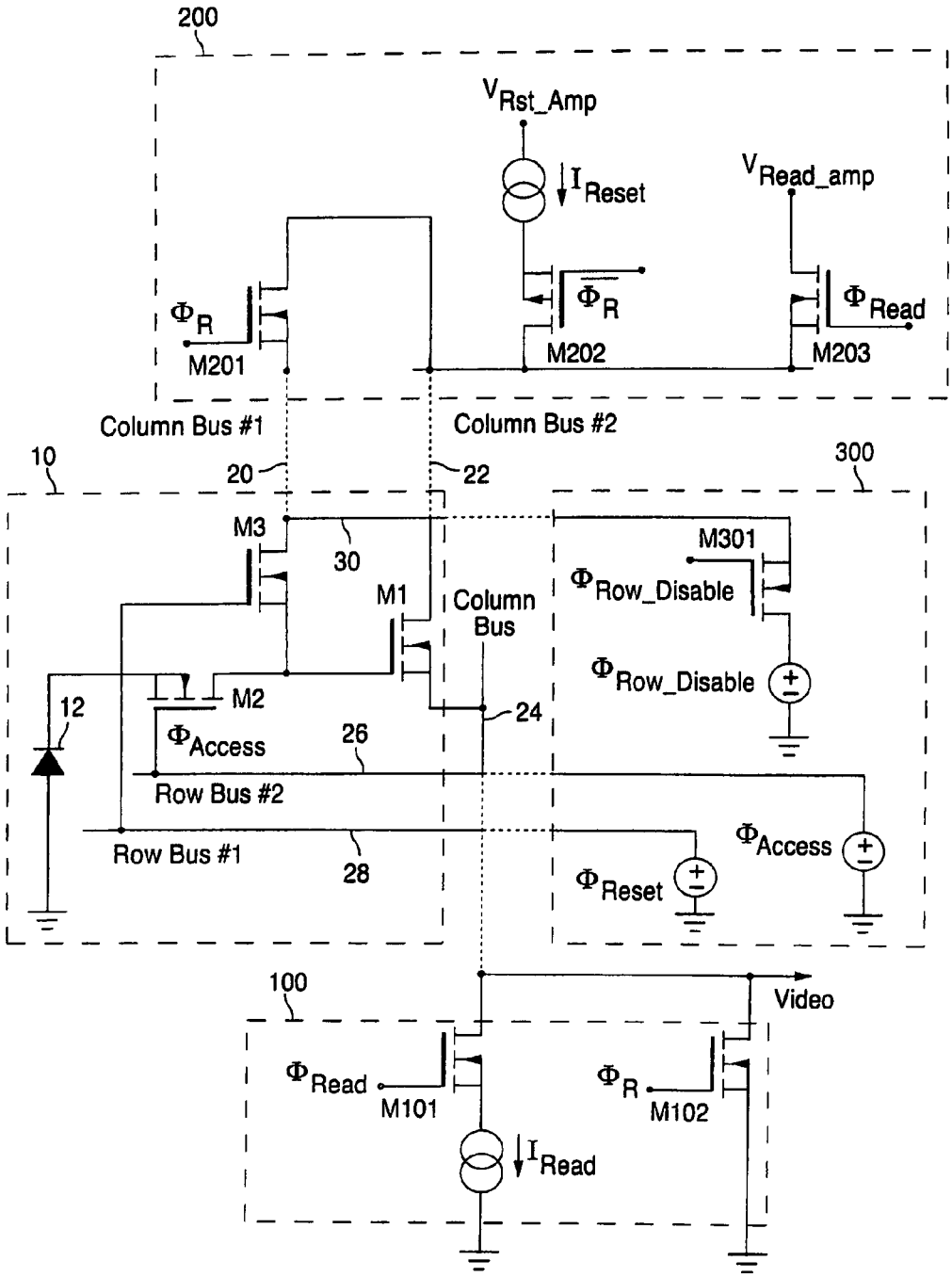
FIG. 3 is a schematic circuit diagram illustrating the compact amplifier system for the CMOS imaging array of the present invention.

The low-noise amplifier system 10 of the present invention is illustrated in the schematic diagram of FIG. 3. In the preferred embodiment, each pixel 10 of the sensor array comprises a photodetector 12 along with three transistors of identical polarity to efficiently use the available pixel real estate. Transistor M1 serves dual roles as the driver of a source follower amplifier for the specific time when the signal is being read on a row-by-row basis, and as the driver of a reset amplifier when the photodetector 12 is being reset. Reset is also performed on a row-by-row basis. Approximately 30 μs is required to reset each row of pixels via the present invention by using circuitry outside of the pixel to effect reset amplification during signal reset. The present invention thus suppresses reset noise without having to implement correlated double sampling using either on-chip or off-chip memory.

Transistor M2 transfers the signal from each detector 12 to the gate of transistor M1 and also connects the detector 12 to the reset node at the gate of transistor M1. Transistor M3 is used in two operating modes. During reset, it completes the reset loop consisting of transistor M3 in the pixel 10, column bus 20, the reset transistor M201 in column circuit 200, and column bus 22. This feedback loop discharges any charge left on the photodetector 12 along with the charge stored on the gate of transistor M1. In combination with amplifier transistor M1, switch transistor M202 in column buffer 200, switch transistor M102 in column buffer 100, and current source $I_{reset}$ in column buffer 200, low-noise reset of the pixel is accomplished via the aggregate reset amplifier.

The photodiode 12 may comprise a substrate diode, for example, with the silicide cleared. In this embodiment, it is necessary to clear the silicide because it is opaque to visible light. Pixel 10 is designed to obtain the largest available light detecting area while providing broad spectral response, control of blooming and signal integration time, and compatibility with CMOS production processes.

For maximum compatibility with standard submicron CMOS processes, photodiode 12 may be formed at the same time as the lightly doped drain (LDD) implant of n-type MOSFETs for the chosen process; this creates an n-on-p photodiode junction in the p-type substrate that is common to most CMOS processes. Since no additional ion implantation is necessary, the process and wafer cost for active-pixel circuit 10 are the same as those of standard, high volume digital electronic products.

Figure 4:
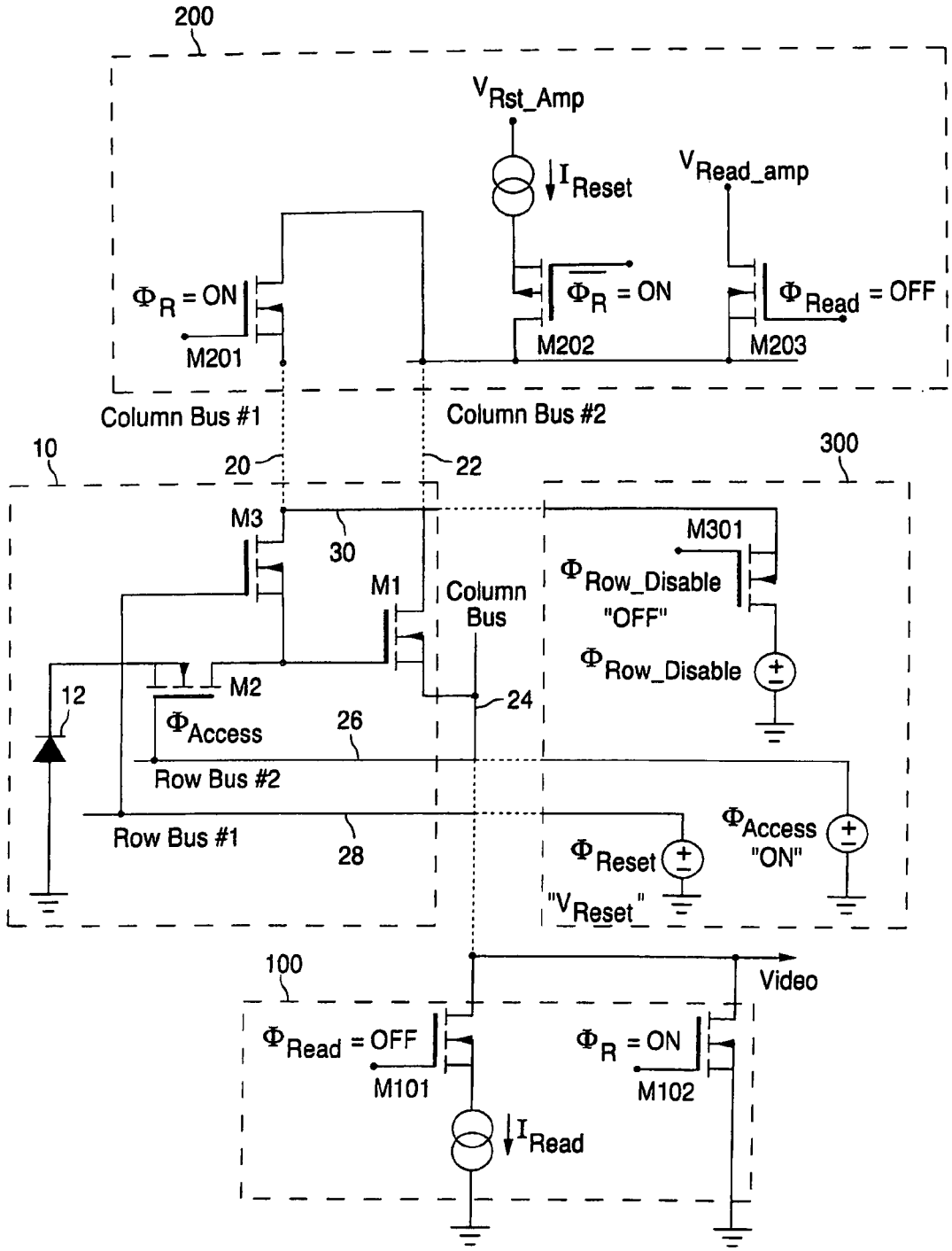
FIG. 4 is a schematic circuit diagram illustrating the compact amplifier system for the CMOS imaging array of the present invention as each row of the imaging array is being reset.
Figure 8:
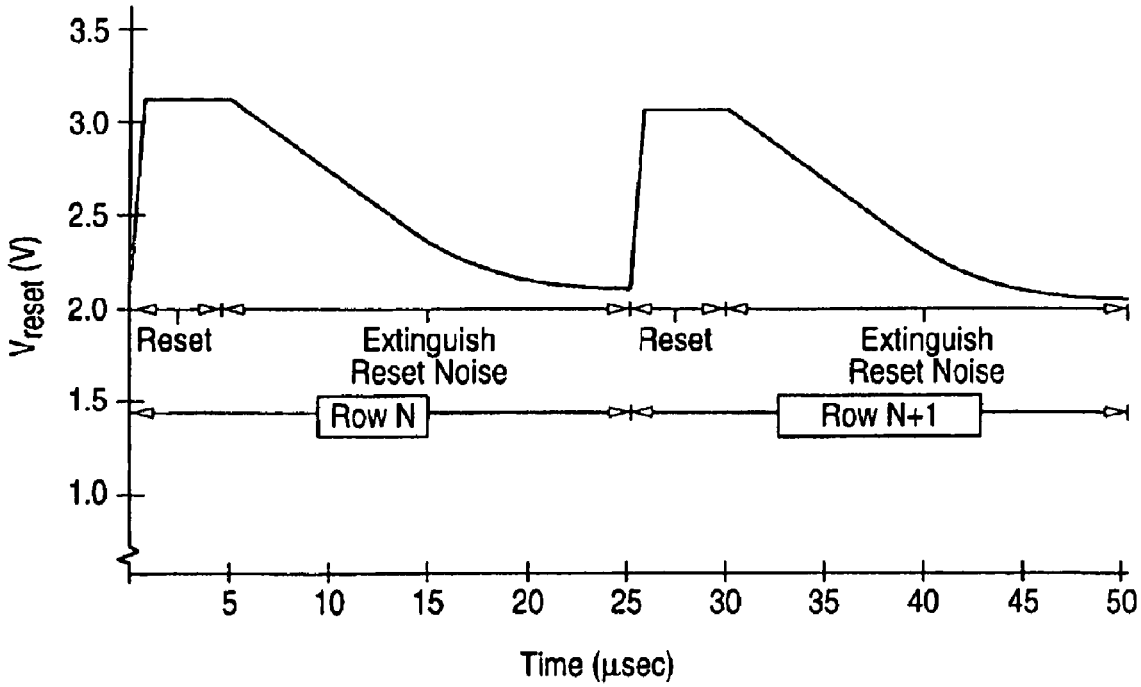
FIG. 8 is a diagram illustrating the tapered reset waveform, $V_{reset}$, which is supplied to the $\Phi_{rst}$ clock during row-based reset of the imaging array.

In the preferred embodiment, the photodetectors 12 are reset at the start of image capture on a row-by-row basis as shown in FIG. 4. Bus 24 connects the pixels in a specific column to a corresponding column circuit 100. Buses 20 and 22 connect all the pixels in a specific column to a second corresponding column circuit 200 comprising switch transistors M201, M202 and M203, and current source $I_{reset}$. Buses 26 and 28 connect all the pixels in a specific row to corresponding row driver 300 consisting of clock drivers $\Phi_{reset}$, $\Phi_{access}$ and $\Phi_{row_disable}$. For the row being reset, $\Phi_{access}$ is "ON" and the $\Phi_{reset}$ waveform is equivalent to the $V_{reset}$ waveform of FIG. 8. For all the other rows, both $\Phi_{access}$ and $\Phi_{reset}$ are "OFF". The feedback path for resetting the photodiode 12 in a resetting row of pixels is hence completed by connecting the drain of M3 to the drain of M1 via the path through switch [transistors] *transistor* M201 [and M202]. The photodiode 12 is connected to the gate of M1 via switch transistor M2, which is fully enabled during this epoch. The inverter amplifier consisting of transistor M2 and current source $I_{reset}$ is thus configured as a reset integrator with capacitive-feedback provided by M1's Miller capacitance. Low-noise reset of photodiode 12 and the gate of M1 are thus performed by applying a tapered reset waveform to the gate of M3. The signal $\Phi_{Reset}$ is specifically generated in the row driver circuit that supports each row of the CMOS imager. Transistor Ml thus acts as a transconductance, and reset transistor M3 acts as a resistance controlled by $\Phi_{Reset}$. The series resistance of transistor M3 is gradually increased by applying slowly a decreasing ramp waveform (FIG. 8) to the gate to give the feedback transconductance of transistor M1 the opportunity to null the reset noise. This active-pixel implementation resets within an aperture of tens of microseconds using standard CMOS technology.

Figure 5:
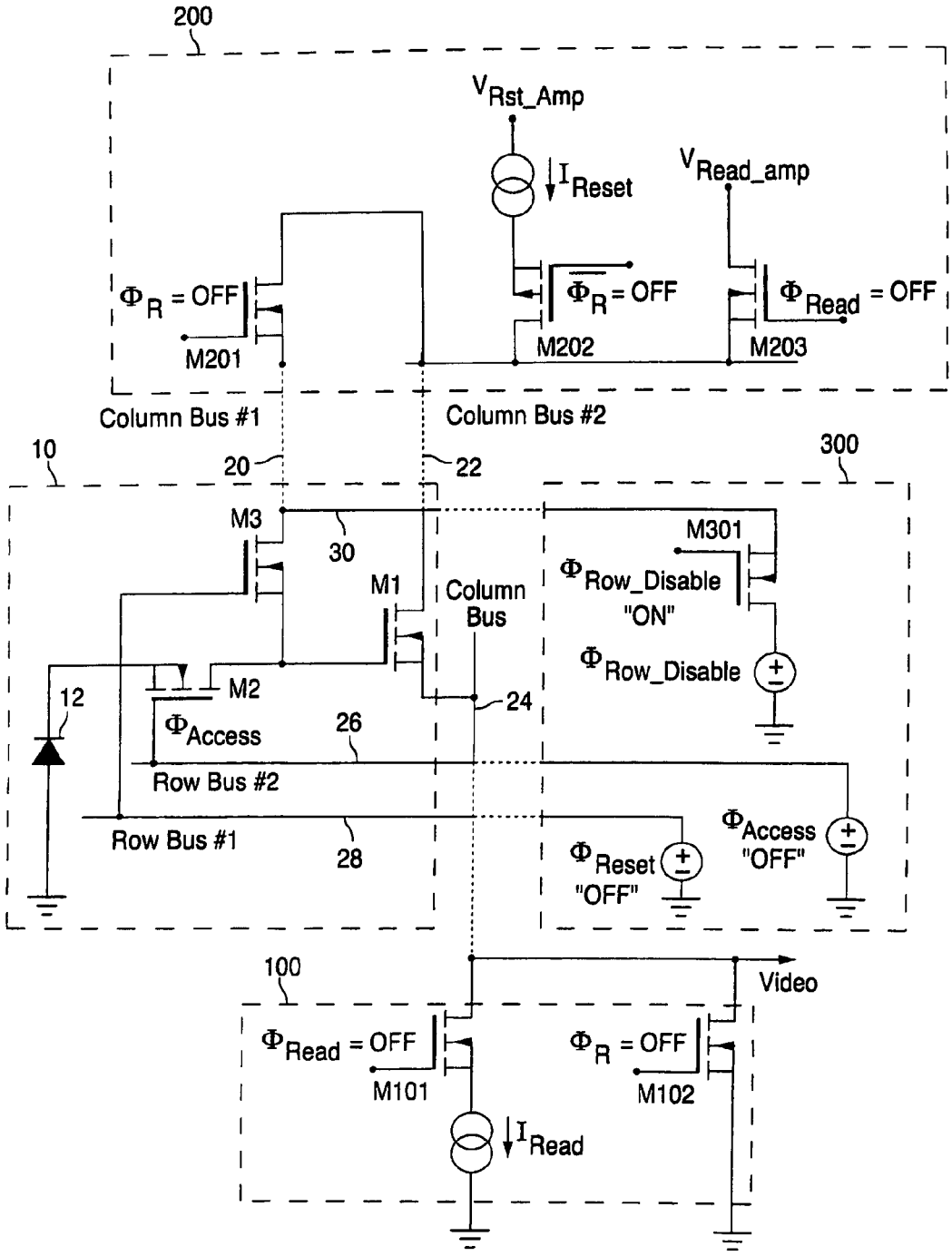
FIG. 5 is a schematic circuit diagram illustrating the compact amplifier system for the CMOS imaging array of the present invention during integration of the photo-generated signal.

The present invention configured for signal integration is illustrated in FIG. 5. Transistors M2 and M3 are now disabled to allow charge to integrate on the photodiode capacitance. As photons are collected by the photodiode 12, the resulting photocharge effectively discharges the photodiode 12 from its previously established reset voltage. For the illustrated embodiment, the photo-generated electrons discharge the anode of photodiode 12 toward ground. All supporting row driver and column buffer circuits are turned off to isolate the array of pixels for unperturbed signal integration. The pixel is configured in this manner for the specified integration time to provide an electronic shutter.

Figure 6:
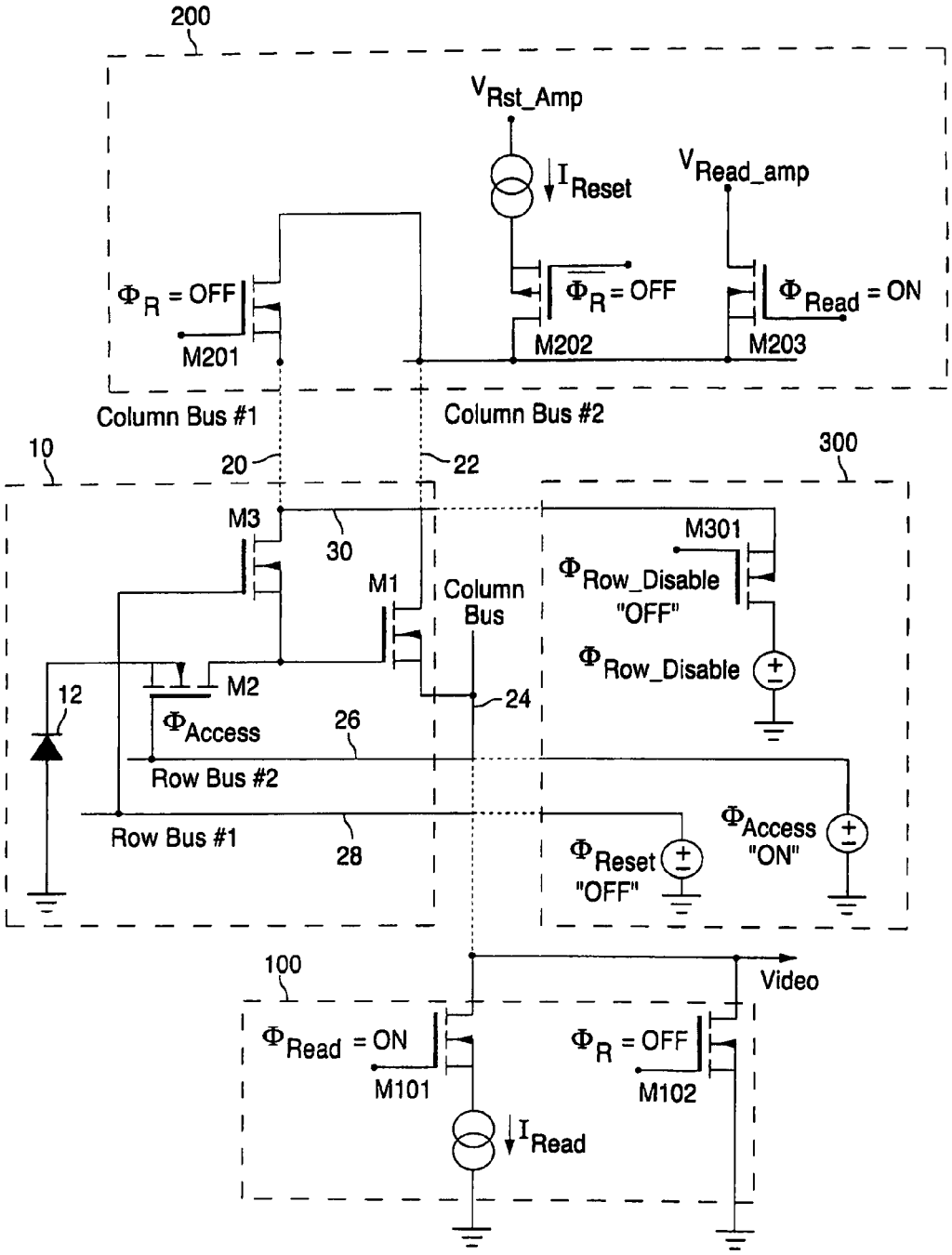
FIG. 6 is a schematic circuit diagram illustrating the compact amplifier system for the CMOS imaging array of the present invention during row-based readout of the imaging array.

FIG. 6 shows the same circuitry as before, but with the switch and clock configuration revised for signal readout. Within each row, pixels 10 are read out from left to right or right to left. Readout is initiated by enabling switch transistor M203 so that the upper leg of M1 is connected via bus 22 to low-impedance voltage source $V_{Read_amp}$. The lower leg of M1 is connected to current source $I_{read}$ in column buffer 100 via column bus 24 and switch transistor M101. Transistor M1 is now the drive transistor of the distributed source follower so that the signal from the gate of each transistor M1 is efficiently transferred to column bus 24. Inactive rows, i.e., those not being read, are disabled by enabling transistors M3 and M301 so that the $\Phi_{row_disable}$ clock is connected to the gate of transistor M1 to disable the source followers in these rows.

The application of the tapered reset waveform to the composite reset amplifier enables the kTC noise envelope to decay before the reset switch M3 is completely opened. Using tapered reset, the row is resettable to tens of microseconds for full noise suppression, or shorter time for moderate noise reduction, U.S. Pat. No. 6,697,111, entitled "COMPACT LOW-NOISE ACTIVE PIXEL SENSOR WITH PROGRESSIVE ROW RESET", issued Feb. 24, 2004, the disclosure of which is herein incorporated by reference, describes the generalized small-signal equivalent circuit model during reset. This circuit allows calculation of the steady-state noise envelope at the reset node depending on reset switch resistance, $R_{sw}$. If the reset voltage is ramped down too slowly, too much time is needed to reset each row and operation at video frame rates can become problematic. If the tapered-reset waveform is instead ramped down too quickly, then the kTC noise envelope will not decay sufficiently to suppress reset noise before the switch is completely opened.

Figure 7:
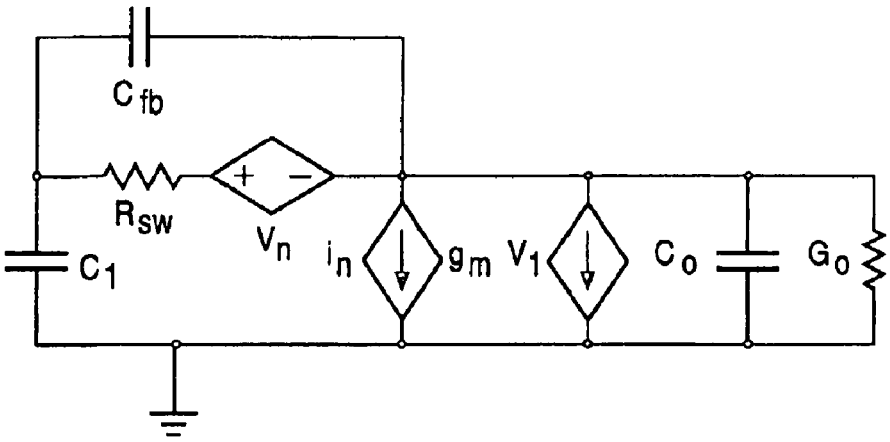
FIG. 7 is a small-signal equivalent circuit diagram illustrating the compact amplifier system for the CMOS imaging array of the present invention during feedback-enhanced reset.

In FIG. 7, which is the small-signal equivalent circuit for the composite reset amplifier, the photodiode node has voltage $V_1$ and capacitance $C_1$ to ground. The amplifier output node has voltage $V_2$, output capacitance $C_o$ and output conductance $G_o$ to ground. $C_o$ is the capacitance associated with the entire reset access bus, most of which comes from the M3-M4 junctions of each row. $g_m$ is the transconductance of transistor M1, possibly degenerated by transistor M4; it is shown as a controlled current source. The feedback capacitance, $C_{fb}$, is the parasitic Miller capacitance of transistor M1. Noise from transistor M1 is represented by current source $i_n$, and noise from transistor M3 (which is operated in the ohmic region) is represented by voltage source $V_n$. Not included in this simplified model is the noise from capacitive feedthrough of the tapered-reset waveform.

Using the small-signal equivalent circuit, a simplified noise formula can be derived since:

$$i_n^2 = \frac{4}{3}(4\ kT)g_m;$$

$$v_n^2 = 4\ kTR_{sw}$$

Assuming that the amplifier's dc gain, $A_{dc}$, is much greater than 1, then the RMS reset noise is:

$$Q_n \cong \sqrt{kT(C_{amp} + C_{sw})_1} + \sqrt{kTC_{fb}}$$

$$Q_n \cong \sqrt{\frac{(kTC)_1}{1 + k_1 + k_2}} + \sqrt{kTC_{fb}} \text{ where}$$

$$k_1 = \frac{R_{sw}G_oC_1}{C_o + C_1} \text{ and } k_2 = \frac{R_{sw}g_mC_{fb}}{C_o + C_1}$$

The tapered-clock waveform's time constant is thus appropriately selected so that the dimensionless quantity $(k_1+k_2)$ is significantly >1. The reset noise is hence reduced to the much smaller quantity stemming from the transconductance amplifier's feedback capacitance. In the present invention, this feedback capacitance is the parasitic Miller capacitance of MOSFET M1.

The present invention has the approximate design values: 1000×700 format, 7 μm×7 μm pixel, $g_m$=20 μmho; $G_o$=0.08 μmho, $A_{dc}$=300; $C_1$=15 fF; $C_o$=3.0 pF and $C_{fb}$=0.3 fF. The desired tapered-clock frequency of 25 kHz that is fully compatible with video rate operation hence requires $R_{sw}$=50 GΩ and an optimum tapered-clock time constant of 25 μs. This yields $k_1+k_2$=58 for the preferred embodiment, and an equivalent noise capacitance of 1.18 fF. Since the nominal detector capacitance is 15 fF and kTC noise is proportional to the square root of the relevant capacitance, the reset noise is suppressed from about 55 e− to only 14 e−.

The value of $R_{sw}$ must be tailored to support any changes in line rate. Increasing the line rate hence requires lower switch resistance. Table 1 below numerically illustrates the impact on reset noise as the tapered-clock time constant is appropriately shortened. At a time constant of 2.7 μsec, the read noise degrades to 55 e−.

TABLE 1

Impact on Reset Noise for Preferred Embodiment

| | | | | | | | | |
|---|---|---|---|---|---|---|---|---|
| $R_{SW}$ (GΩ) | 50 | 20 | 10 | 5 | 2 | 1 | 0.5 | 0.1 |
| $k_1 + k_2$ | 58 | 23.2 | 11.6 | 5.8 | 2.32 | 1.16 | 0.58 | 0.12 |
| Reset Noise (e−) | 14 | 7 | 21 | 26 | 35 | 41 | 47 | 55 |
| τ (μsec) | 25 | 25 | 24 | 22 | 18 | 14 | 9.5 | 2.7 |

In the preferred embodiment, column bus 20 is monitored by a standard column buffer to read the video signal when it is available. The key requirements on the column buffer are similar to conventional designs having to handle voltage-mode signals and are familiar to those skilled in the art.

In the present invention, the various clocks are generated on-chip using standard CMOS digital logic. This digital logic implementation thus enables "windowing," wherein a user can read out the imager in various formats simply by enabling the appropriate support logic to clock the appropriate sub-format. With windowing, the 1024×728 format of the candidate embodiment can be read out as one or more arbitrarily sized and positioned M×N arrays without having to read out the entire X×Y array. For example, a user might desire to change a computer-compatible "VGA" format (i.e., approximately 640×480) to either Common Interface Format (CIF; nominally 352×240) or Quarter Common Interface Format (QCIF; nominally 176×120) without having to read out all the pixels in the entire array. This feature simplifies support electronics to reduce cost and match the needs of the particular communication medium. As an example, a personal teleconference link to a remote user having only QCIF capability could be optimized to provide QCIF resolution and thus reduce bandwidth requirements throughout the teleconference link. As a further example, an imager configured in Common Interface Format (CIF) could provide full-CIF images while supplying windowed information for the portions of the image having the highest interest for signal processing and data compression. During teleconferencing the window around a person's mouth (for example) could be supplied more frequently than the entire CIF image. This scheme would reduce bandwidth requirements throughout the conference link.

Figure 9:
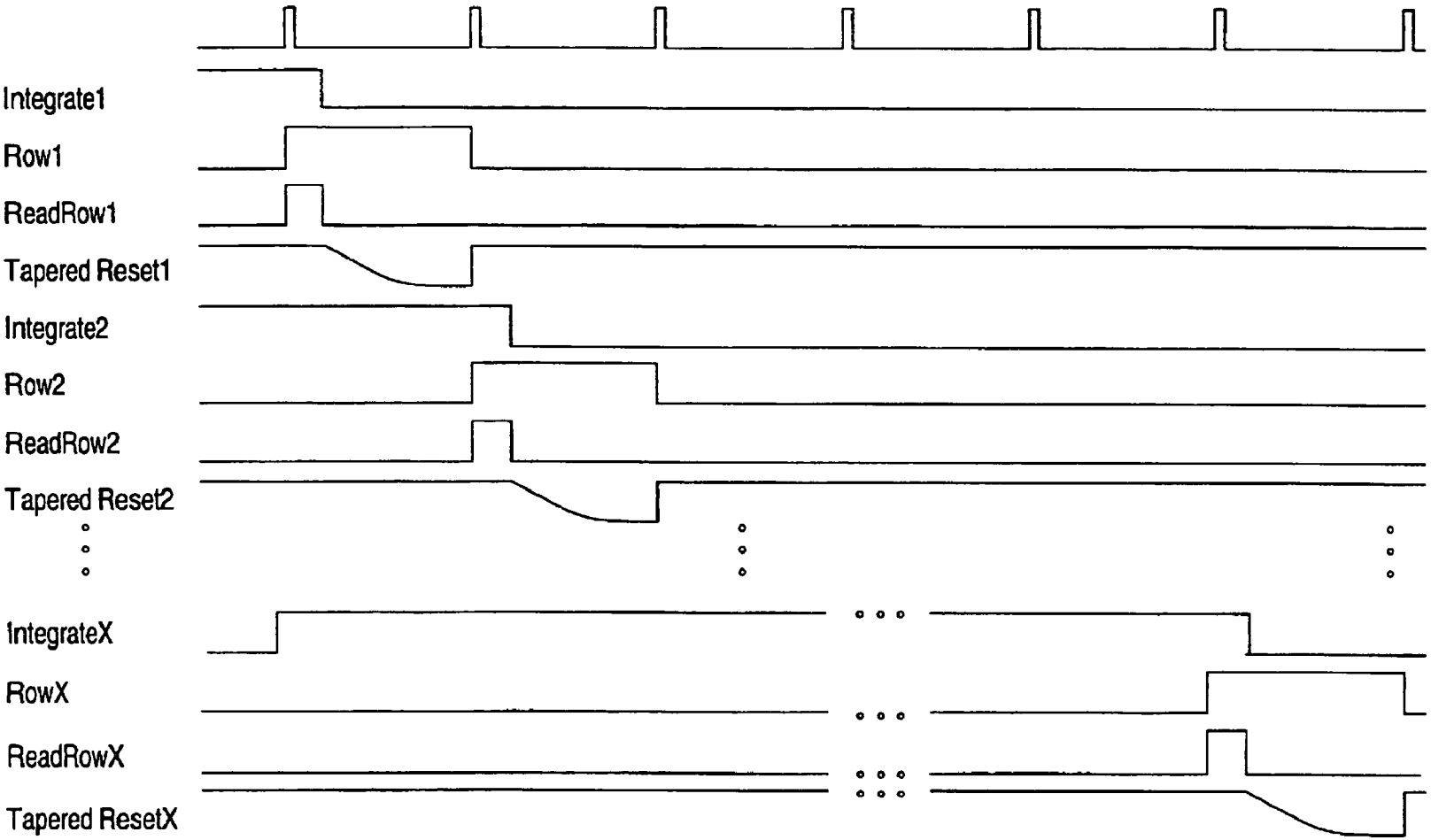
FIG. 9 is a clock timing diagram illustrating the process of signal integration across a representative imager array and the successive application row-based tapered reset.

FIG. 9 illustrates representative clock timing waveforms for reading the signal from each row, resetting each row using a tapered reset wavefomm, and then proceeding to the next row even as signal integration continues across the array in the same manner as a focal plane shutter. To read the first row, an internally generated clock waveform designated "ROW1" enables the video readout and reset processes previously shown in detail in FIGS. 4 and 6. When the corresponding "READ" pulse is high, for example, signal readout is performed as per FIG. 6. The pixel reset configuration depicted in FIG. 6 occurs during the time when the TAPERED RESET clock is shown active Oust after READ goes low). Since signal integration and hence, image formation, proceed through the array as a progressive, electronic focal-plane shutter per the operating specifics shown in FIG. 5, the maximum image latency between rows is one row time. The maximum image latency across the entire imaging array is about one frame time, which is essentially about two integration times when the integration time is comparable to the frame time. Further, since separate readout of the reset and signal voltages is not needed, it is not necessary to wait on each row to perform correlated double sampling.

Though not explicitly shown in FIG. 9, the programmability of the present invention also allows integration epochs of less than or equal to one line period (or time). In such a case, each line's integration epoch does not overlap with the integration epochs of adjacent lines. The image formation, however, is still progressive and formed on a row-by-row basis without the need for reading the reset voltages.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An active pixel sensor circuit comprising:

a photodetector;

an access transistor connected to the photodetector;

an electronically reconfigurable transistor, successively operated as a source follower driver and a feedback amplifier, connected to an output of the access transistor and to a signal output bus;

a reset transistor connected between the access transistor and the electronically reconfigurable transistor, wherein the reset transistor is reset with a tapered reset signal; and a first column buffer connected to the electronically reconfigurable transistor and to the reset transistor, the first column buffer comprising:

a first switch transistor connected to the reset transistor; [and a second switch transistor connected to the electronically reconfigurable transistor;]

wherein during a reset operation, the first [and second] switch [transistors connect] *transistor connects* the reset transistor with the electronically reconfigurable transistor to form a feedback path.

2. The circuit of claim 1, wherein the transistors are MOSFETs of identical polarity.

3. The circuit of claim 2, further comprising a second column buffer connected to the signal output bus.

4. The circuit of claim 3, further comprising a row disable transistor connected to the reset transistor.

5. The circuit of claim 4, wherein the first column buffer, second column buffer and row disable transistor are connected to a plurality of active pixel sensor circuits.

6. The circuit of claim 5, wherein the electronically reconfigurable transistor operates as a driver of a source follower amplifier when a signal from the photodetector is being read out on a row-by-row basis, and operates as a driver of a reset amplifier when the photodetector is being reset.

7. A CMOS imager array comprising a plurality of pixels, each pixel comprising:

a photodetector;

an access MOSFET having a source connected to the photodetector;

an amplifier MOSFET having a gate connected to a drain of the access MOSFET, a source connected to a signal bus, and a drain connected to a column buffer;

a reset MOSFET having a source connected to the drain of the access MOSFET, a drain connected to the column buffer, and a gate connected to a tapered reset signal generator; and a distributed feedback amplifier comprising the amplifier MOSFET, the reset MOSFET and the column buffer to taper reset the photodetector, wherein the column buffer comprises:

a first switch transistor connected to drain of the reset MOSFET; [and]

a second switch transistor connected to the drain of the amplifier MOSFET; *and*

*a reset current source connected to the second switch transistor;* wherein during a reset operation, the first [and second] switch [transistors connect] *transistor connects* the drain of the reset MOSFET with the drain of the amplifier MOSFET to form a feedback path, *and the second switch transistor connects the reset current source to the amplifier MOSFET.*

8. The imager array of claim 7, further comprising a row disable MOSFET having a source connected to the drain of the reset MOSFET and a drain connected to a row disable signal generator.

9. The imager array of claim 8, further comprising an access signal generator connected to the gate of the access MOSFET.

10. The imager array of claim 9, further comprising a second column buffer connected to the signal bus.

11. The imager array of claim 10, wherein the MOSFETs within each pixel are of identical polarity.

12. The imager array of claim 11, wherein the photodetector comprises a substrate diode with the silicide cleared.

13. An active pixel sensor circuit comprising:

a photodetector;

an access transistor connected to the photodetector;

an amplifier transistor, connected to an output of the access transistor and to a signal output bus;

a reset transistor connected between the access transistor and the amplifier transistor, wherein the reset transistor is reset with a tapered reset signal; and a first column buffer connected to the amplifier transistor and to the reset transistor, the first column buffer comprising:

a first switch transistor connected to the reset transistor; [and]

a second switch transistor connected to the amplifier transistor; *and*

*a reset current source connected to the second switch transistor;* wherein during a reset operation, the first [and second] switch [transistors connect] *transistor connects* the reset transistor with the amplifier transistor to form a feedback path, *and the second switch transistor connects the reset current source to the amplifier transistor.*

*14. An imager array circuit comprising:*

*a first switch transistor connected to a first column bus;*

*a second switch transistor connected to a second column bus and the first switch transistor;*

*a reset current source connected to the second switch transistor;*

*a signal column bus; and*

*a plurality of pixel circuits connected to the first column bus, second column bus, and signal column bus, each pixel circuit comprising:*

*a photodetector;*

*an access transistor connected to the photodetector;*

*an amplifier transistor connected to the access transistor, the signal column bus and the second switch transistor; and*

*a reset transistor connected to the first column bus, the access transistor, and the amplifier transistor, wherein during a reset operation, the first switch transistor connects the reset transistor to the amplifier transistor to form a feedback path, and the second switch transistor connects the reset current source to the amplifier transistor.*

*15. The circuit of claim 14, wherein the amplifier transistor operates as a driver of a source follower amplifier when a signal from the photodetector is being read out, and operates as a driver of a reset amplifier when the photodetector is being reset.*

*16. The circuit of claim 1, wherein the first column buffer further comprises:*

*a second switch transistor connected to the electronically reconfigurable transistor; and*

*a reset current source connected to the second switch transistor;*

*wherein during a reset operation, the second switch transistor connects the reset current source to the electronically reconfigurable transistor.*

* * * * *